United States Patent
Cheung et al.

(10) Patent No.: US 7,944,638 B1
(45) Date of Patent: May 17, 2011

(54) METHOD AND APPARATUS FOR SCHEDULING SPIRAL INTERRUPTS FOR SELF-SERVO WRITE

(75) Inventors: Man Cheung, Campbell, CA (US); Perry Neos, Los Altos, CA (US); Luan Ton-That, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/643,844

(22) Filed: Dec. 21, 2009

Related U.S. Application Data

(60) Provisional application No. 61/143,009, filed on Jan. 7, 2009.

(51) Int. Cl.
*G11B 5/09* (2006.01)
*G11B 20/12* (2006.01)

(52) U.S. Cl. .......................... 360/51; 360/75
(58) Field of Classification Search .................. None
See application file for complete search history.

(56) References Cited

U.S. PATENT DOCUMENTS

| | | | |
|---|---|---|---|
| 6,378,051 B1 * | 4/2002 | Henson et al. | 711/151 |
| 7,050,260 B1 * | 5/2006 | Tung et al. | 360/75 |
| 7,133,239 B1 * | 11/2006 | Hartman et al. | 360/75 |
| 7,139,144 B1 * | 11/2006 | Hartman et al. | 360/51 |
| 7,167,333 B1 * | 1/2007 | Liikanen et al. | 360/75 |
| 7,355,808 B1 * | 4/2008 | Tung et al. | 360/75 |
| 7,499,234 B1 * | 3/2009 | Rigney et al. | 360/75 |
| 7,667,911 B2 * | 2/2010 | Lau | 360/51 |
| 7,688,542 B2 * | 3/2010 | Chan et al. | 360/77.05 |
| 7,773,335 B1 * | 8/2010 | Adler et al. | 360/51 |

* cited by examiner

*Primary Examiner* — Wayne R Young
*Assistant Examiner* — James L Habermehl

(57) ABSTRACT

A method for dynamic spiral ISR scheduling determines a dynamic delay with spiral to spiral spacing information of a disk, so as to ensure that the sum of a primary ISR time and a secondary ISR time does not exceed the wedge to wedge time. The ISR time may be scheduled to start after a delay for the sum of a static delay and the dynamic delay from an edge. A system for dynamic spiral ISR scheduling uses a dynamic delay determining unit to determine a dynamic delay, and an ISR scheduling unit to schedule the start of a secondary spiral set ISR based on a sum of the dynamic delay and a static delay.

20 Claims, 8 Drawing Sheets

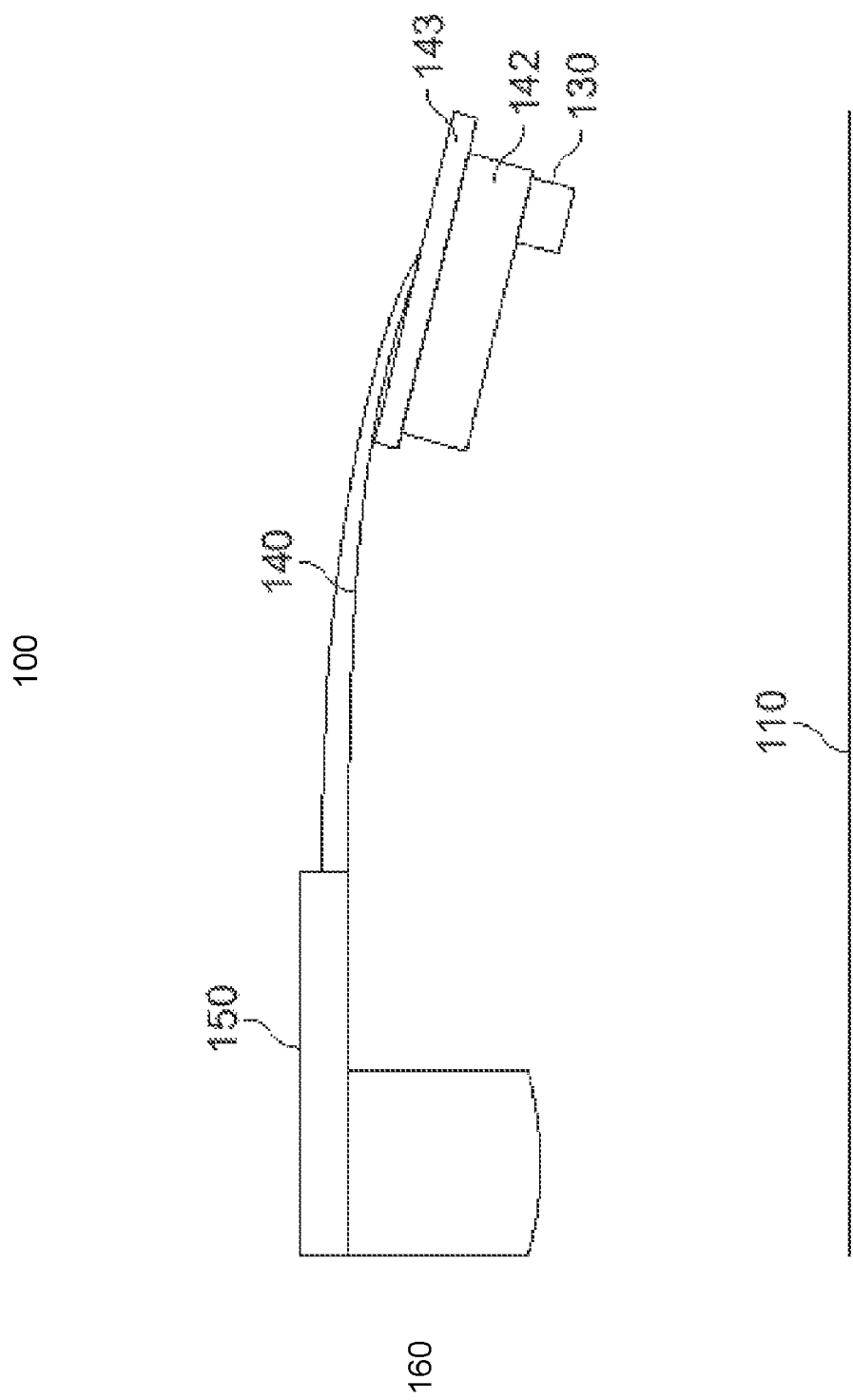

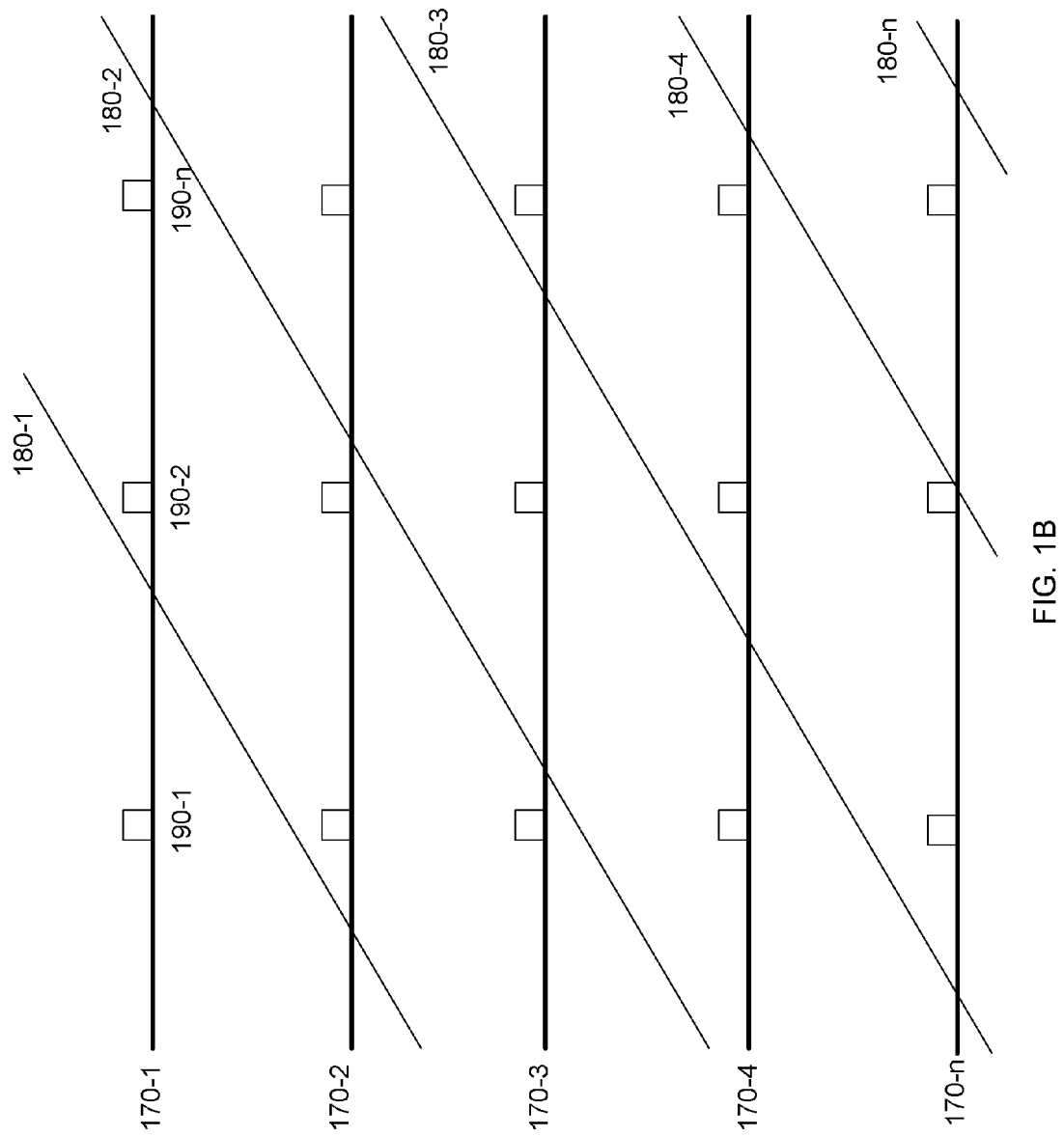

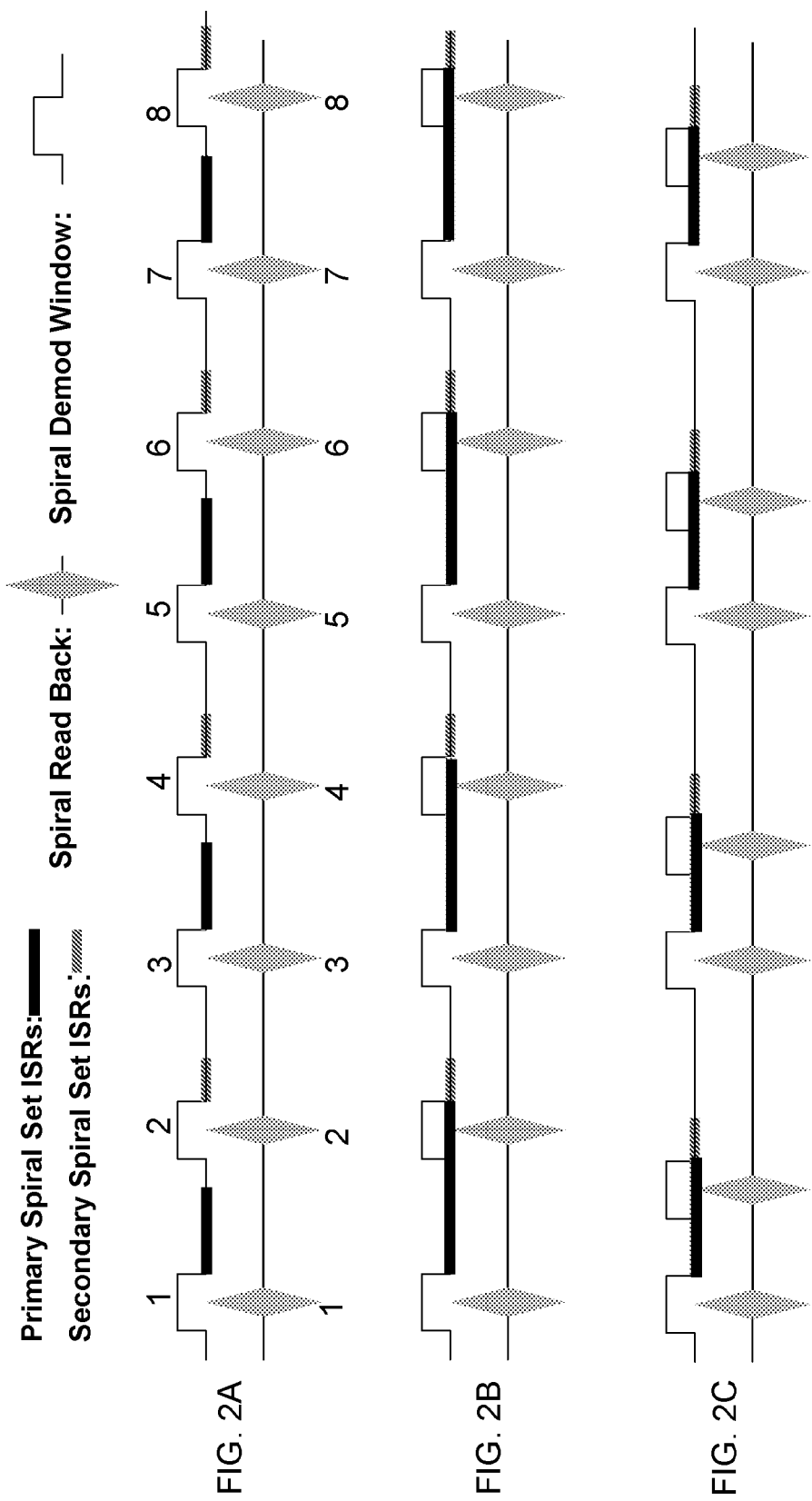

METHOD AND APPARATUS FOR SCHEDULING SPIRAL INTERRUPTS FOR SELF-SERVO WRITE

CROSS REFERENCE TO RELATED APPLICATION

This application claims the benefit of priority to previously filed U.S. provisional patent application Ser. No. 61/143,009, filed Jan. 7, 2009, entitled AN INTELLIGENT METHOD TO SCHEDULE SPIRALS INTERRUPTS FOR SELF-SERVO WRITE. That provisional application is hereby incorporated by reference in its entirety.

BACKGROUND

1. Field of the Invention

The present invention relates generally to disk drives, and more specifically to a self-servo writing process.

2. Description of Related Art

Storage devices like hard disk drives (HDD) are widely used in electronic devices, such as computers, MP3 players, video recorders, digital cameras and set-top boxes which need to store a large amount of data. FIG. 1A illustrates a typical HDD 100, including at least one disk 110, which a spindle motor can cause to rotate around the axle of a central drive hub. A read/write transducer or head 130 is attached to a load beam 140 of a suspension via a slider and a gimbal. The load beam 140 is supported by an actuator arm 150 of an actuator 160. In operation, the actuator 160 moves the head 130 across tracks on the disk 110 until the head 130 is positioned at a target track, so that information can be written to, and read from, the surface of the disk.

FIG. 1B illustrates a portion of an exemplary disk 110. Information can be written in concentric tracks 170-1, 170-2, ... 170-n on the disk 110, extending from near the inner diameter (ID) of the disk to near the outer diameter (OD) of the disk. Since a track may hold thousands of bytes of data, it may be further divided into smaller units called sectors. The tracks and sectors may be created during the low level formatting (LLF) of the disk performed during manufacturing, e.g., by self-servo writing (SSW). During self-servo writing, spirals 180-1, 180-2, ... 180-n may be written on the disk 110 from its inner diameter to its outer diameter, and wedges 190-1, 190-2, ... 190-n may be created. Spirals 180-n may indicate radial and circumferential data of head position relative to that of the disk 110 when the path of the spiral is known. Servo information (e.g., track numbers) may be written in servo wedges 190-n, which may be recorded on a certain number of tracks.

The head 130 seeks across the disk 110 and writes during servo spirals 180-n. SSW using spirals may use two sets of interleaved spirals: a primary set with longer interrupt service routine (ISR) time and a secondary set with shorter ISR time. Both sets will eventually overlap with wedges, but at different times. Only one set of spirals, usually the primary set, is needed to control the actuator 160. The secondary set is used to prepare for switching when the primary set is about to overlap with where the wedges are to be written and the servo information in the primary set is not accessible, so that the actuator 160 may continue to receive the servo information.

ISR time is the time to execute the time critical code to service an interrupt. When a wedge 190-n flies under the head 130, hardware of the disk drive 100 may create an interrupt and the ISR time may start. During the ISR time, a processor may decipher and translate the servo information stored in the wedge 190-n to a physical location, decide whether the head 130 is at where it is supposed to be, and whether the head 130 needs to be moved, e.g., to the left or to the right. After the ISR time, the processor may go back to what it was doing, e.g., transferring data.

The prior art methods schedule spiral ISR starts at a fixed delay from the presence of the spirals. FIG. 2A illustrates a typical scenario with prior art spiral ISR scheduling with perfect spiral placement. In FIG. 2A, a diamond is a read back signal generated when a spiral is under the head 130, and hardware of the disk drive may demodulate a spiral during a spiral demodulation window. As shown, a primary spiral set ISR starts at the falling edge of an odd (i.e., 1, 3, 5 ... ) spiral demodulation window, and ends before half of the wedge to wedge time, which is the time between two consecutive odd (i.e., 1, 3, 5, ... ) diamonds or two consecutive even (i.e., 2, 4, 6, ... ) diamonds. A secondary spiral set ISR starts at a falling edge of an even (i.e., 2, 4, 6, ... ) spiral demodulation window.

If one ISR time has not completed before the next ISR time is supposed to start, the next ISR will be skipped and the required timing/synchronization will be lost. FIG. 2B illustrates a worst case scenario with prior art spiral ISR scheduling with perfect spiral placement. As shown, to prevent synchronization from being lost, the primary ISR time cannot be longer than the spiral to spiral time or half of the wedge to wedge time, although a considerable part of the wedge to wedge time is wasted.

Spirals may be written either before or after a disk is assembled, and either method may result in spirals which are not uniformly spaced, a condition called spirals crowding. FIG. 2C illustrates a typical scenario with prior art spiral ISR scheduling with spirals crowding. As shown, to prevent synchronization from being lost, the primary ISR time has to be shorter than the shortest spiral to spiral time, with a large part of the wedge to wedge time being wasted.

Prior art approaches try to reduce the ISR time to keep it within limitations. One prior art approach for reducing SSW ISR time increases CPU clock speed. Another prior art approach uses multiple CPU cores to distribute the ISR load. Both approaches are costly.

To meet the ever-increasing storage requirement, more and more data will need to be stored on a disk. As aerial density of disks increases, tracks per inch (TPI), bits per inch (BPI) and servo sample rate also increase, resulting in shorter and shorter wedge to wedge time. In addition, spiral to spiral spacing may vary significantly from the target spacing depending on how spirals were written. These may create more constraints on the ISR time scheduling.

Therefore, it may be desirable to provide a method for scheduling SSW ISR which is more flexible and may allow higher disk data density.

SUMMARY

A method for dynamic spiral ISR (Interrupt Service Routine) scheduling of self servo writing in a storage comprises: obtaining spiral to spiral spacing information of a disk and determining a location of a primary spiral and a location of a secondary spiral, and a wedge to wedge time; determining a dynamic delay of a secondary spiral ISR time such that a sum of a primary spiral ISR time and the secondary spiral ISR time does not exceed the wedge to wedge time; and scheduling the secondary spiral ISR in response to the spiral to spiral spacing information and the dynamic delay.

The method of dynamic spiral ISR scheduling may further comprise: determining a static delay of the secondary spiral ISR time.

The method of dynamic spiral ISR scheduling may further comprise: obtaining a sum of the dynamic delay and the static delay of the secondary spiral ISR time.

The method of dynamic spiral ISR scheduling may further comprise: delaying a start of the secondary spiral ISR time for the sum of the dynamic delay and the static delay of the secondary spiral ISR time.

An apparatus for dynamic spiral ISR (Interrupt Service Routine) scheduling of self servo writing in a storage comprises: a spiral to spiral spacing information obtaining unit configured to obtain spiral to spiral spacing information of the disk and determining a location of a primary spiral and a location of a secondary spiral, and a wedge to wedge time; and a dynamic delay determining unit configured to determine a dynamic delay of a secondary spiral ISR time based on the spiral spacing information, such that a sum of a primary spiral ISR time and the secondary spiral ISR time does not exceed the wedge to wedge time.

The apparatus for dynamic spiral ISR scheduling may further comprise: a static delay determining unit for determining a static delay of the secondary spiral ISR time.

The apparatus for dynamic spiral ISR scheduling may further comprise: an adder for obtaining a sum of the dynamic delay and the static delay of the secondary spiral ISR time.

The apparatus for dynamic spiral ISR scheduling may further comprise: an ISR scheduling unit for delaying a start of the secondary spiral ISR time for the sum of the dynamic delay and the static delay of the secondary spiral ISR time.

BRIEF DESCRIPTION OF THE DRAWING FIGURES

Embodiments are described herein with reference to the accompanying drawings, similar reference numbers being used to indicate functionally similar elements.

FIGS. 1A and 1B illustrate a HDD and a disk with which the method of the present invention may be used.

FIGS. 2A-2C illustrate scenarios of conventional ISR scheduling.

DETAILED DESCRIPTION

Figure 3:
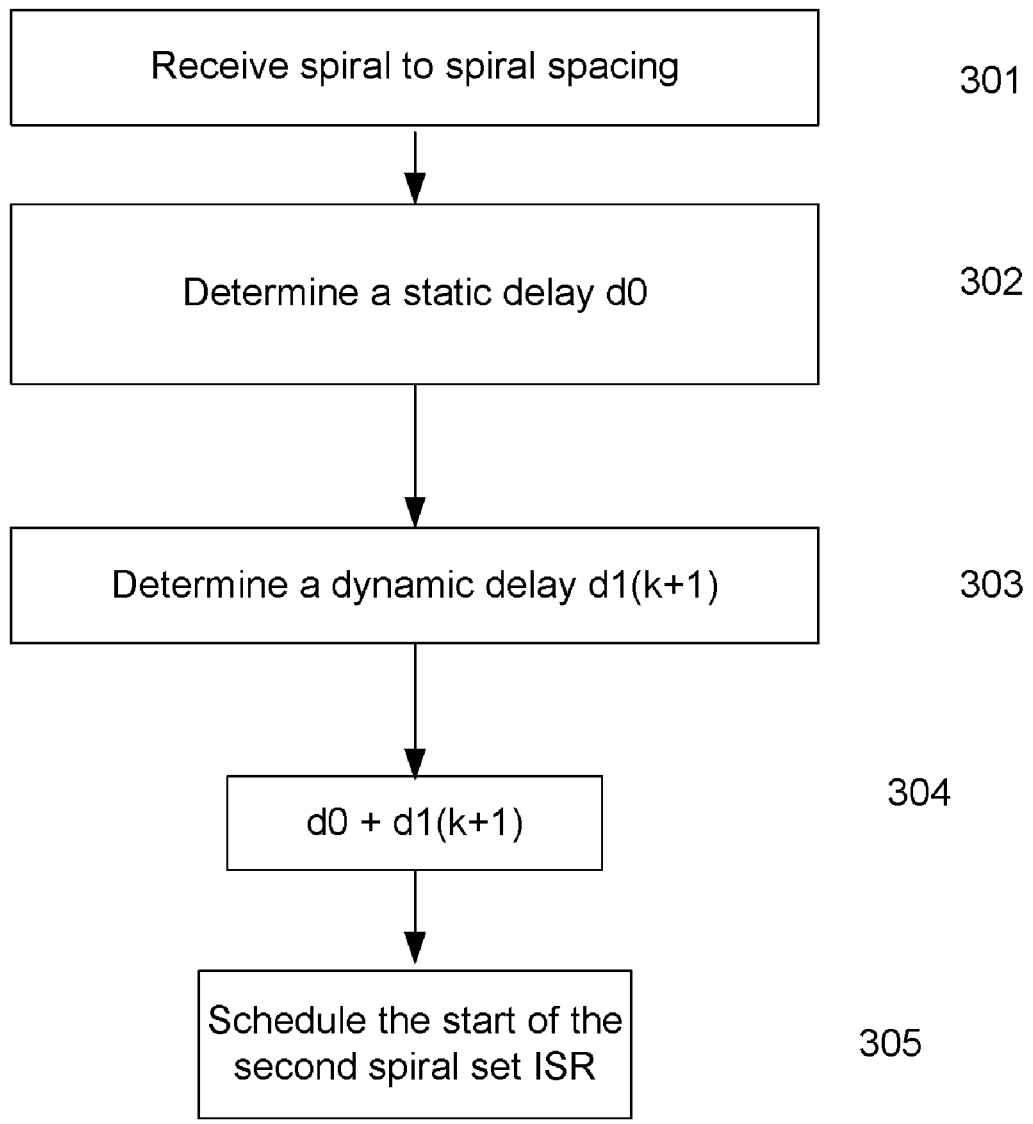
FIG. 3 is a flowchart of a method for dynamic spiral ISR scheduling according to one embodiment of the present invention.

FIG. 3 is a flowchart of a method for dynamic spiral ISR scheduling according to one embodiment of the present invention.

At 301, spiral to spiral spacing information is obtained. In one embodiment, spiral to spiral spacing and knowledge of how the spiral to spiral spacing behaves over time may be inferred from repeatable runouts (RROs) of spiral demodulation window timings. In one embodiment, the RROs of spiral demodulation window timings may be adaptively updated. The spiral spacing may be obtained from the window location, and the ISR time may be scheduled to start after a static delay and/or a dynamic delay from an edge of the window.

Figure 4:
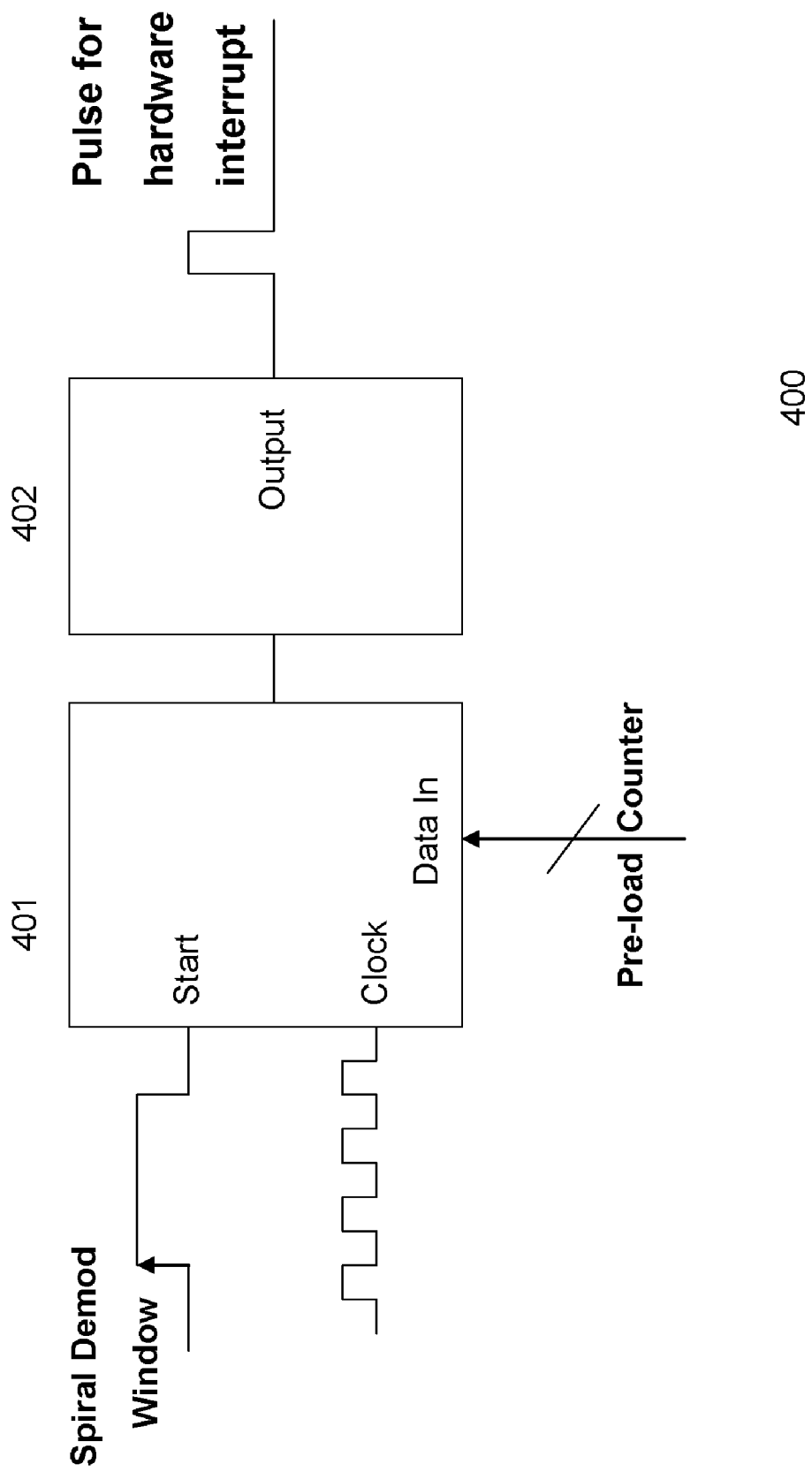
FIG. 4 is a block diagram of a static delay determining unit according to one embodiment of the present invention.

At 302, a static delay d0 of the ISR time is determined. The static delay d0 is common for all spirals, and may be the static minimal delay after the presence of a spiral to ensure that hardware of a disk drive completes spiral decoding before the data is used or processed. A circuit for determining the static delay of the ISR time according to one embodiment of the invention is shown in FIG. 4.

At 303, a dynamic delay d1($k$+1) of the ISR time is determined. In one embodiment, the dynamic delay d1($k$+1) is determined to ensure that the sum of a primary ISR time and a secondary ISR time does not exceed the wedge to wedge time.

Assuming w is the wedge to wedge time and all spiral ISR times are less than w/2, t(k) is the spiral demodulation window time for the kth spiral, d1($k$) is the current dynamic delay of the kth spiral and is a value not smaller than 0, and the expected time for the (k+1)th spiral is w/2. A backward spiral to spiral time deviation from the expected time, delta, may be the next spiral demodulation window time minus the current spiral demodulation window time minus the expected time, i.e.:

$$\text{delta} = t(k+1) - t(k) - w/2 \quad (1)$$

When delta >0, the (k+1)th spiral may be further apart than the expected time w/2, and when delta <0, the (k+1)th spiral may be closer than the expected time w/2.

The dynamic delay of the (k+1)th spiral may be the maximum of 0 and the dynamic delay of the kth spiral d1($k$) minus delta, i.e.:

$$d1(k+1) = \max(0, d1(k) - \text{delta}) \quad (2)$$

$$= \max(0, d1(k) - (t(k+1) - t(k) - w/2)) \quad (3)$$

Figure 5A:
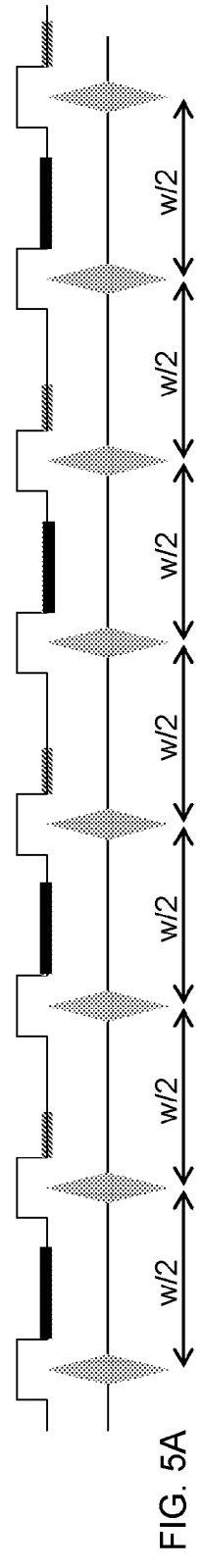
FIGS. 5A-5E illustrate scenarios of dynamic spiral ISR scheduling according to embodiments of the present invention.
Figure 5B:
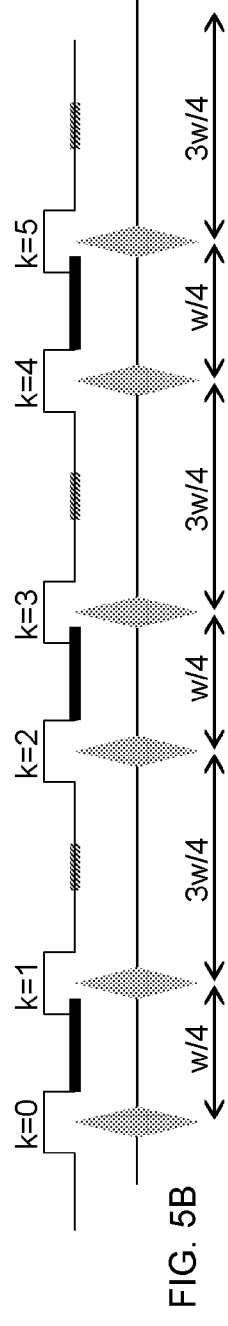
Figure 5C:
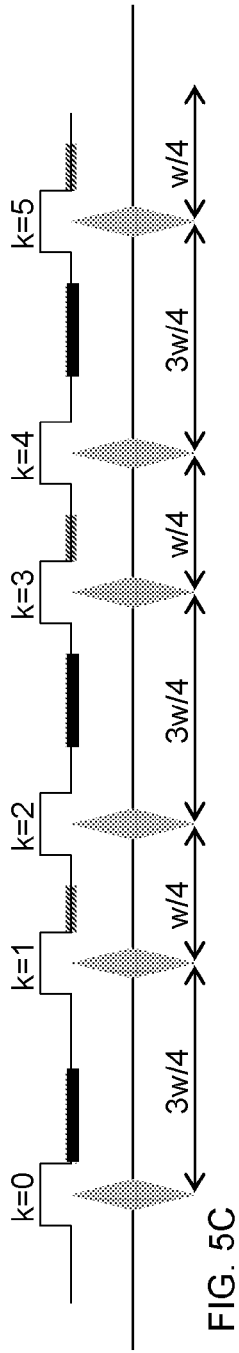

FIG. 5A-5C are exemplary results of the dynamic delay of the ISR time obtained according to equations (1)-(3) with spiral ISR times <w/2. There is no spiral crowding in the scenario shown in FIG. 5A, since the spirals are perfectly placed. There is no deviation either, i.e., delta=t(k+1)−t(k)−w/2=0. Thus, when d1(0)=0, and d1($k$)=0 for k=1, 2, 3, . . . .

There is spiral crowding in the scenario shown in FIG. 5B, and the spiral to spiral times are w/4 and 3w/4 respectively. When k=0 and d1(0)=0, delta=w/4−w/2=−w/4, d1(0)−delta=w/4, and the dynamic delay d1(1)=w/4. When k=1 and d1(1)=w/4, delta=3w/4−w/2=w/4, d1(1)−delta=0, and the dynamic delay d1(2)=0. Similarly, d1($k$)=0 for k=4, 6, . . . , and d1($k$)=w/4 for k=3, 5, . . . .

There is also spiral crowding in the scenario shown in FIG. 5C, and the spiral to spiral times are 3w/4 and w/4 respectively. When k=0 and d1(0)=0, delta=3w/4−w/2=w/4, d1(0)−delta=−w/4, and dynamic delay d1(1)=0. When k=1 and d1(1)=0, delta=w/4−w/2=−w/4, d1(1)−delta=w/4, and the dynamic delay d1(2)=w/4. Similarly, d1($k$)=w/4 for k=4, 6, . . . and d1($k$)=0 for k=3, 5, 7, . . . .

Now return to FIG. 3. At 304, the sum of the static delay d0 of the ISR time and the dynamic delay d1($k$) of the ISR time may be determined. Since the dynamic delay d1($k$+1) changes with the spiral to spiral time, the sum may change as well.

At 305, the ISR time may be scheduled to start after a delay for the sum of d0 and d1($k$) from an edge, e.g., the falling edge, of a corresponding spiral demodulation window. In FIG. 5A, the dynamic delays are all 0, and the ISR time of each spiral may only be delayed for the static delay d0. In FIG. 5B, d1($k$)=0 for k=2, 4 and 6, so the ISR time of each of these spirals may only be delayed for the static delay d0. Since $d1(k)=w/4$ for $k=1$, 3 and 5, the ISR time may be delayed for the sum of the static delay d0 and dynamic delay w/4. In FIG. 5C, $d1(k)=w/4$ for $k=2$, 4 and 6, so the ISR time of each of these spirals may be delayed for the sum of the static delay d0 and the dynamic delay w/4. Since $d1(k)=0$ for $k=3$, 5 and 7, the ISR time for these spirals may only be delayed for the static delay d0.

In FIGS. 5B and 5C, the secondary spiral set ISRs start well after half of the wedge to wedge time, thus allowing the primary spiral set ISRs to extend well beyond half of a wedge to wedge time, as long as the sum of the primary spiral set ISR time and the secondary spiral set ISR time is smaller than the wedge to wedge time. Consequently, the dynamic scheduling method of FIG. 3 does not have to follow the prior art limitations, and may reach higher data density.

Thus, instead of scheduling spiral ISRs after a fixed delay from the presence of the spirals, an embodiment of the present invention determines a static delay and a dynamic delay of the ISR time, obtains a sum of the static delay and the dynamic delay, and schedules the ISR time using the sum.

It should be understood that equations (1) to (3) only provide an example for determining the dynamic delay of the ISR time. Other methods may be used, as long as the sum of the primary ISR time and the second ISR time does not exceed the wedge to wedge time.

Figures 5D, 5E:
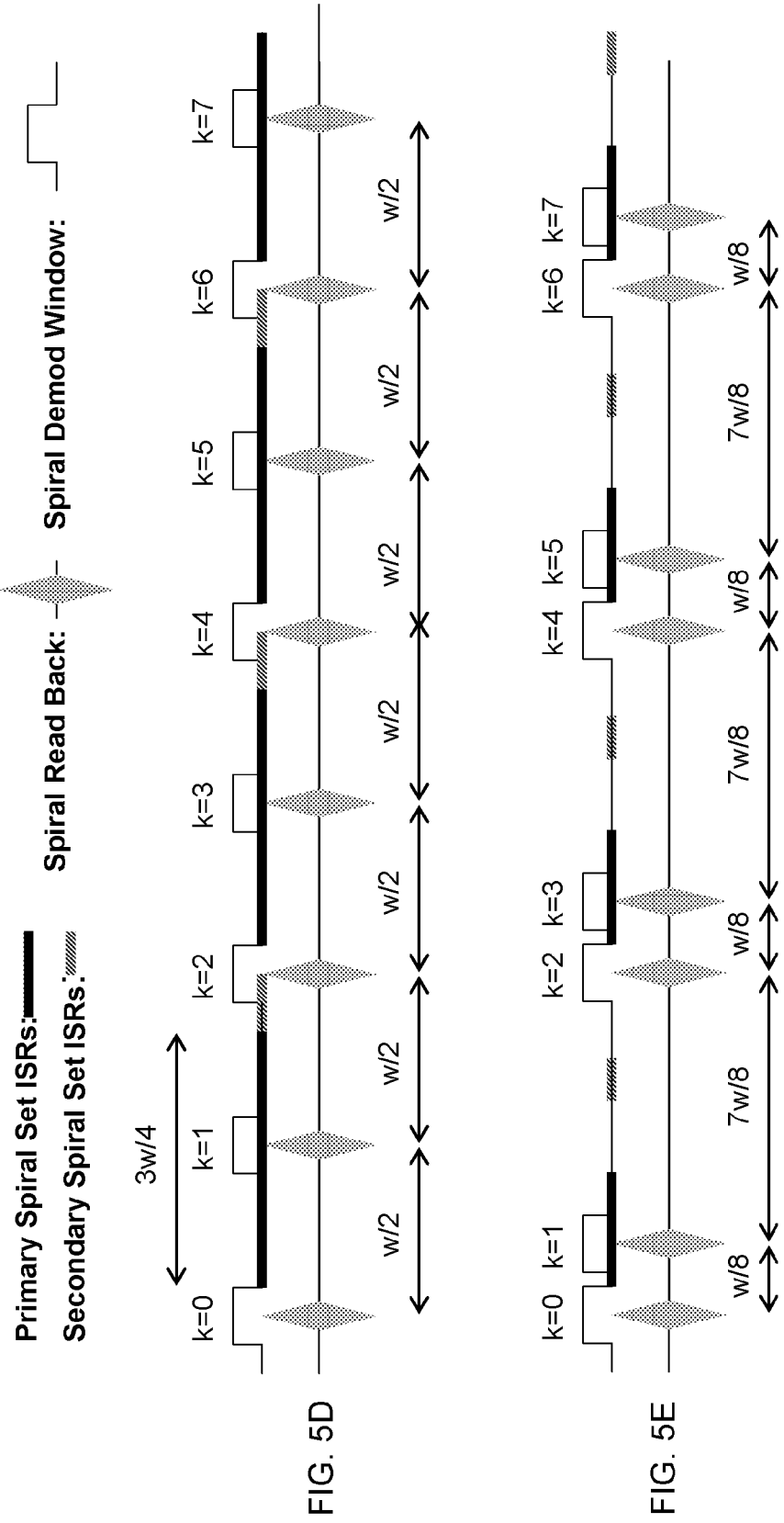

FIG. 5D illustrates a scenario of spiral ISR scheduling with perfect spiral placement according to one embodiment of the present invention. As shown, instead of stopping within the first spiral, the primary spiral set ISRs extend well beyond the first spiral and only a very small part of the wedge to wedge time is wasted. This exemplary case illustrates that without the dynamic ISR scheduling, the secondary ISRs cannot happen, which will mess up the servo system. Since the primary ISRs extend beyond w/2, equations (1) to (3) are no longer applicable in this case and an adjustment to the excess ISRs is needed. In FIG. 5D, assume the primary ISRs time is 3w/4, then $d1(k)=0$ for $k=2$, 4 and 6, so the ISR time of each of these spirals may only be delayed for the static delay d0. For $k=1$, 3, 5 and 7, $d1(k)=w/4$, and the ISR time may be delayed for the sum of the static delay d0 and dynamic delay w/4.

FIG. 5E illustrates a scenario of spiral ISR scheduling with imperfect spiral placement according to one embodiment of the present invention. Because of the spiral crowding, the first spiral is very short, and the primary spiral set ISRs have to be kept within the first spiral if the conventional spiral ISR scheduling is used. However, with the dynamic ISR scheduling in an embodiment of the present invention, the primary spiral set ISRs can extend well into the secondary spiral, and much more of the wedge time may be used. This exemplary case also illustrates that without the dynamic ISR scheduling, the secondary ISRs cannot happen, which will mess up the servo system. In FIG. 5E, $d1(k)=0$ for $k=2$, 4 and 6, so the ISR time of each of these spirals may only be delayed for the static delay d0. For $k=1$, 3, 5 and 7, $d1(k)=3w/8$, and the ISR time may be delayed for the sum of the static delay d0 and dynamic delay 3w/8.

FIG. 4 is a block diagram of a static delay determining unit for determining the static delay d0 of the ISR time according to one embodiment of the present invention. A static delay determining unit 400 may have a counter 401 (which may be a down counter or an up counter) and a pulse generator 402. The counter 401 may receive a pre-loaded count value via a "Data in" port, receive spiral demodulation window signals via a "Start" port, and a clock via a "Clock" port. The pulse generator 402 may be coupled to an output of the counter 401, and provide a pulse as spiral interrupt signal at an "Output" port.

A rising edge of the spiral demodulation window may trigger the counter 401 to count down from (or up to) the pre-loaded count value and the clock may be used to control the count sequence. The pulse generator 402 may generate a pulse, or an interrupt, with its rising edge starting when the counter has started and its falling edge starting when the counter has reached a zero counter value (for a down counter) or a count related to the pre-loaded count value (for an up counter). The interrupt event time measured from the rising edge of the spiral demodulation window is the time it takes to reach the pre-loaded count value, and may be used as the static delay d0. The length of the static delay d0 may be controlled by adjusting the pre-loaded count value.

Figure 6:
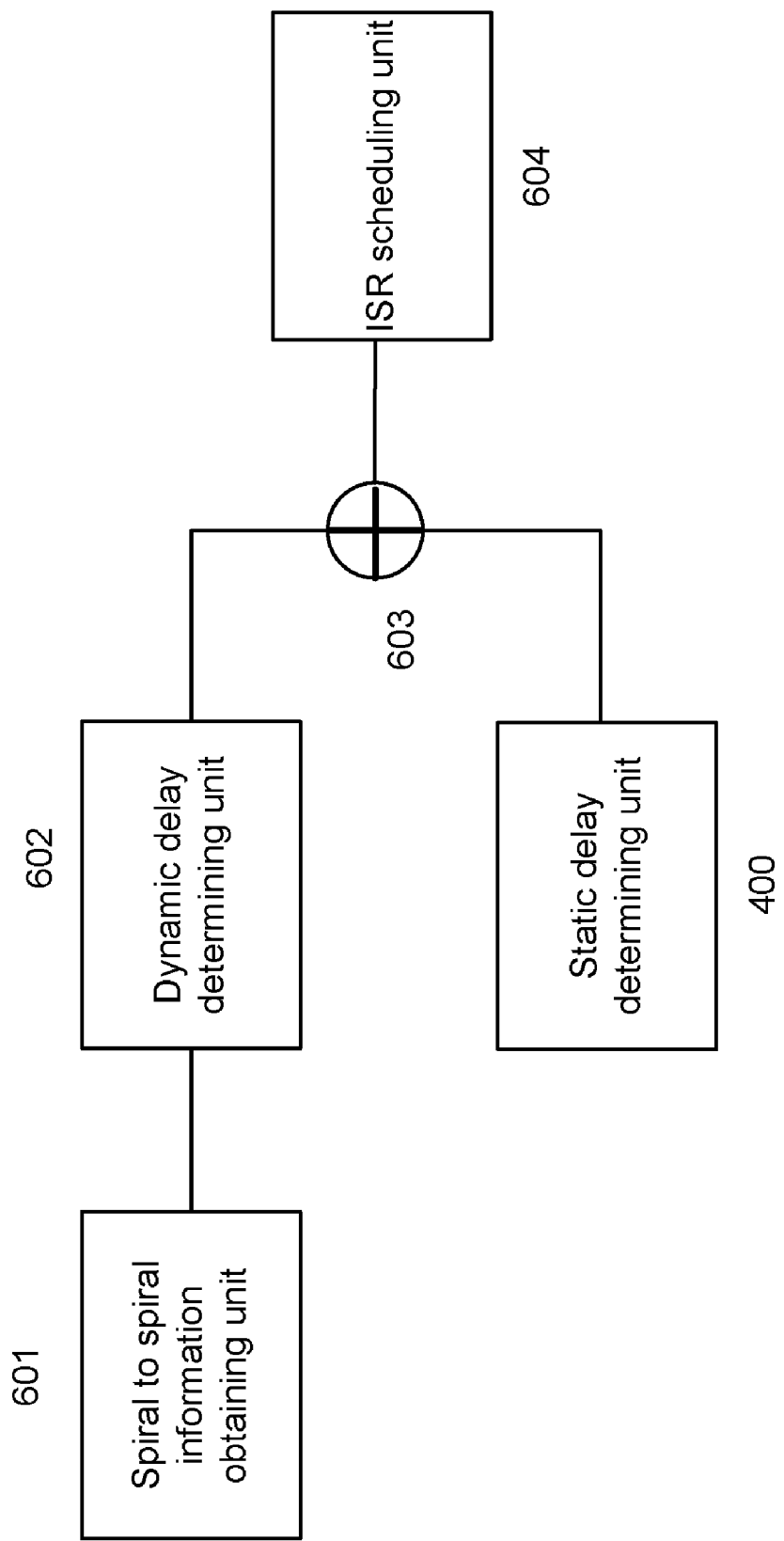
FIG. 6 is a block diagram of an apparatus for dynamic spiral ISR scheduling according to one embodiment of the present invention.

FIG. 6 is a block diagram of an apparatus for dynamic spiral ISR scheduling according to one embodiment of the present invention. The apparatus may have a spiral to spiral spacing information obtaining unit 601, a static delay determining unit 400, a dynamic delay determining unit 602, an adder 603, and an ISR scheduling unit 604.

The spiral to spiral spacing information obtaining unit 601 may infer information about spiral to spiral spacing and how the spiral to spiral spacing behaves over time. In one embodiment, such information may be inferred from RROs of spiral demodulation window timings.

The static delay determining unit 400 may determine a static delay d0. An embodiment of the static delay determining unit 400 is shown in FIG. 4.

The dynamic delay determining unit 602 may be coupled to the spiral to spiral spacing information obtaining unit 601, and use the information received to determine a dynamic delay $d1(k+1)$. In one embodiment, the dynamic delay determining unit 603 may use equations (1) to (3) to determine the dynamic delay $d1(k+1)$.

The adder 603 may add the static delay d0 from the static delay determining unit 400 and the dynamic delay $d1(k+1)$ from the dynamic delay determining unit 602 together.

The ISR scheduling unit 604 may receive the sum of the static delay d0 and the dynamic delay $d1(k+1)$ and schedule the start of a secondary spiral set ISR, e.g., after a delay for the sum of d(0) and d(k+1) from the falling edge of the demodulation window of a corresponding spiral.

The invention is not limited by the manner, apparatus, or method by which the spirals are written on a disk. Servo writing or pack writing of spirals may be used. Ramp track writing also may be used. Embodiments of the invention also may be implemented in situations in which CPU manipulation also is employed, e.g. speeding up the CPU clock speed or using a multi-core CPU, as has been discussed.

Several features and aspects have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A method for dynamic spiral ISR (Interrupt Service Routine) scheduling of self servo writing on a disk in a storage device, the method comprising:
   obtaining spiral to spiral spacing information of the disk and determining a location of a primary spiral and a location of a secondary spiral on the disk, and a wedge to wedge time;

determining a dynamic delay of a secondary spiral ISR time such that a sum of a primary spiral ISR time and the secondary spiral ISR time does not exceed the wedge to wedge time; and scheduling the secondary spiral ISR in response to the spiral to spiral spacing information and the dynamic delay.

2. The method of claim 1, further comprising: determining a static delay of the secondary spiral ISR time.

3. The method of claim 2, further comprising: obtaining a sum of the dynamic delay and the static delay of the secondary spiral ISR time.

4. The method of claim 3, further comprising: delaying a start of the secondary spiral ISR time for the sum of the dynamic delay and the static delay of the secondary spiral ISR time.

5. The method of claim 4, further comprising: obtaining a backward spiral to spiral time deviation from an expected time for the secondary spiral, which is a secondary spiral demodulation window time minus a primary spiral demodulation window time minus the expected time.

6. The method of claim 5, further comprising: obtaining a dynamic delay of the primary spiral.

7. The method of claim 6, further comprising: obtaining a dynamic delay of the secondary spiral which is the maximum of 0 and the dynamic delay of the primary spiral minus the deviation, and the dynamic delay of the secondary spiral ISR time is used to compensate for the dynamic delay of the secondary spiral.

8. The method of claim 2, further comprising: loading a count value to a counter, wherein the count value is selected based on the static delay of the secondary spiral ISR time.

9. The method of claim 8, further comprising: receiving a spiral demodulation window, and triggering counting of the counter with a rising edge of the spiral demodulation window.

10. The method of claim 9, further comprising: generating an interrupt signal, with its rising edge starting when the counter has started and its falling edge starting when the counter has reached a counter value.

11. An apparatus for dynamic spiral ISR (Interrupt Service Routine) scheduling of self servo writing on a disk in a storage device, the apparatus comprising:

a spiral to spiral spacing information obtaining unit configured to obtain spiral to spiral spacing information of the disk and determining a location of a primary spiral and a location of a secondary spiral on the disk, and a wedge to wedge time; and a dynamic delay determining unit configured to determine a dynamic delay of a secondary spiral ISR time based on the spiral spacing information, such that a sum of a primary spiral ISR time and the secondary spiral ISR time does not exceed the wedge to wedge time.

12. The apparatus of claim 11, further comprising: a static delay determining unit for determining a static delay of the secondary spiral ISR time.

13. The apparatus of claim 12, further comprising: an adder for obtaining a sum of the dynamic delay and the static delay of the secondary spiral ISR time.

14. The apparatus of claim 13, further comprising: an ISR scheduling unit for delaying a start of the secondary spiral ISR time for the sum of the dynamic delay and the static delay of the secondary spiral ISR time.

15. The apparatus of claim 14, wherein the dynamic delay determining unit obtains a backward spiral to spiral time deviation from an expected time for the secondary spiral, which is a secondary spiral demodulation window time minus a primary spiral demodulation window time minus the expected time.

16. The apparatus of claim 15, wherein the dynamic delay determining unit further obtains a dynamic delay of the primary spiral.

17. The apparatus of claim 16, wherein the dynamic delay determining unit further obtains a dynamic delay of the secondary spiral which is the maximum of 0 and the dynamic delay of the primary spiral minus the deviation, and the dynamic delay of the secondary spiral ISR time is used to compensate for the dynamic delay of the secondary spiral.

18. The apparatus of claim 12, wherein the static delay determining unit further comprises a counter which receives a value selected based on the static delay.

19. The apparatus of claim 18, wherein the static delay determining unit further receives a spiral demodulation window which triggers counting of the counter with a rising edge.

20. The apparatus of claim 19, wherein the static delay determining unit further generates an interrupt signal, with its rising edge starting when the counter has started and its falling edge starting when the counter has reached a predetermined counter value.

* * * * *